Patented Dec. 30, 1947

2,433,597

UNITED STATES PATENT OFFICE 2,433,597

METHODS OF PREPARING RUTILE SEEDING AGENTS

Winfred J. Cauwenberg, Piney River, and Leif Aagaard, Amherst, Va., assignors, by mesne assignments, to American Cyanamid Company, a corporation of Maine No Drawing. Application January 31, 1942, Serial No. 428,998

3 Claims. (Cl. 23—202)

This invention relates to the preparation of rutile titanium dioxide by the calcination of an anatase precipitate under controlled conditions, and aims to provide a special method of making a seed therefor.

Titanium dioxide, within the thirty years since its introduction as a pigment, has made such rapid strides that it has become the outstanding white pigment used in the coating and allied industries; this popularity is due mainly to its whiteness, stability, high hiding power, higher tinting strength, and ready dispersibility in vehicles. It is prepared largely by the hydrolysis, under carefully controlled conditions, of titanium sulfate solutions containing iron, prepared by digestion of ilmenite (a native ferrous titanate) with sulfuric acid, followed by reduction of all ferric iron to ferrous iron, removal of a part of the iron by crystallization as ferrous sulfate, clarification and adjustment of concentration; the hydrolysate is calcined, together with conditioning agents, to produce the desired white pigment.

The titanium dioxide so produced has been predominantly of anatase crystal structure, one of the three crystal modifications (anatase, brookite, rutile) in which titanium dioxide occurs. The art has known that the rutile structure, on account of its higher refractive index, should have higher hiding power and tinting strength than the anatase structure, but rutile titanium dioxide having better hiding power and tinting strength has not been available commercially because there has been no process for its production at a cost comparable with that of producing anatase.

It is well known that the uncalcined precipitate obtained by the hydrolysis of titanium sulfate has the crystal structure of anatase which is further developed upon calcination as the combined water and the combined and/or adsorbed acid are expelled. It is also known that the uncalcined precipitate obtained by the hydrolysis of titanium salts of monobasic acids such as, for example, titanium chloride, has the crystal structure of rutile which is further developed upon calcination. It is also known that the anatase structure obtained by the hydrolysis of titanium sulfate can be converted to rutile by continued calcination at a very high temperature. Such calcination, however, causes crystal growth and discoloration, which results in a product undesirable for use as a white pigment. No process in which the titanium is precipitated from salts of monobasic acids is economically competitive with the sulfate process largely because of higher acid cost and the corrosion problems introduced by the use of these monobasic acids.

In co-pending patent application Serial No. 422,104, filed December 8, 1941, now abandoned, it is proposed to convert an anatase precipitate, obtained by the hydrolysis of titanium sulfate solutions, to rutile, by first roasting the precipitate in the presence of an alkali metal salt, washing the roasted precipitate substantially free of alkali metal salt, and then calcining in the presence of a small amount of a rutile seed consisting of calcined titanium dioxide, having the crystal structure of rutile, or consisting of an uncalcined precipitate obtained by the hydrolysis of an aqueous solution of a monobasic acid compound of titanium. It is disclosed that the rutile seed may be added either prior to or after the roasting operation.

In co-pending patent application Serial No. 422,082, filed December 8, 1941, now abandoned, it is proposed to convert an anatase precipitate, obtained by the hydrolysis of titanium sulfate solutions, to rutile by calcining in the presence of a small amount of an alkali metal compound and a small amount of a rutile seed consisting of calcined titanium dioxide having the crystal structure of rutile or consisting of an uncalcined precipitate obtained by hydrolysis of an aqueous solution of a monobasic acid compound of titanium.

In co-pending Ross and Tanner application, Serial No. 429,118, filed January 31, 1942, it is proposed to prepare a rutile seed for use in the production of titanium dioxide of rutile crystal structure by treating an alkali metal titanate with limited quantities of a monobasic acid, such as hydrochloric acid. The titanate is treated with hydrochloric acid in sufficient quantity to combine with the sodium oxide and in sufficient excess for about 20% to about 50% of theory for the formation of titanium tetrachloride. About 25% of the theoretical quantity for titanium tetrachloride after neutralizing the sodium oxide is preferred. The hydrochloric acid slurry is diluted with water and boiled for about one hour. Nitric acid or other monobasic acids may be used in place of hydrochloric acid. The amount of acid used is insufficient for complete solution of titanium. The titanium, however, during the boiling period, is transferred to a desirable rutile seed for use in converting anatase structure to rutile structure during calcination. Some such seeds prepared by us have shown by X-ray analysis substantially complete rutile structure.

In that above-identified application, the alkali metal titanate is prepared from a sulfate hydrolysate which is boiled for several hours to obtain precipitation.

We have now discovered an especially economical method for the preparation of such hydrated titanium dioxide, in which a precipitate readily reactable with alkali to form a titanate is obtained in a few minutes. Our method consists in adding a titanium sulfate solution to a hot aqueous alkaline solution in such relative proportions that the basicity of the mixed solution is increased so that the molar ratio of available $SO_3$ to $TiO_2$ is about 1.4 to 1.0, corresponding, on a molar basis, to a factor of acidity of 40%, as a result of which substantially immediate precipitation occurs. Substantially any sulfate solution or alkali can be used.

Example 1

The precipitation may be made, for example, from a clarified basic sulfate solution of ilmenite ore, from which part of the iron has been removed by crystallization as ferrous sulfate. A typical analysis of such a solution is as follows:

| | |
|---|---|
| Specific gravity | 1.42 |
| Titanium dioxide ($TiO_2$) per cent | 10 |
| Ferrous sulfate ($FeSO_4$) do | 10 |
| Sulfuric acid ($H_2SO_4$) combined with titanium dioxide per cent | 18 |

To 3 liters of boiling water is added 10 grams of hydrated lime, and then during about 10 minutes is added one liter of the basic sulfate solution containing 150 grams of titanium dioxide at a temperature of about 60° C. The mixture is boiled for about five minutes, at the end of which time about 90% of the titanium is precipitated. The precipitate is filtered and washed substantially free of iron and calcium salts.

In our procedure for the conversion of hydrated titanium dioxide such as is made by the method of Example 1, to rutile seed, the hydrated oxide is treated with an alkaline alkali metal compound, such as sodium hydroxide, potassium hydroxide, etc. The hydrated oxide is treated with from about one part to about five parts by weight of sodium hydroxide to one part of anhydrous titanium dioxide and heated for from about one hour to about six hours at a temperature of about 80° C. to 100° C. About one and one-half parts of sodium hydroxide is a preferred amount. Solid flake sodium hydroxide may be mixed with the concentrated aqueous pulp of the hydrated titanium dioxide, and then heated without further agitation. A concentrated aqueous solution of sodium hydroxide may be mixed with the hydrated titanium dioxide pulp and heated while continuously stirring. Depending on the amount of sodium hydroxide used, and also upon the concentration of the sodium hydroxide and hydrated titanium dioxide mixture, the temperature may vary considerably up to and above 100° C., even up to the fusion point, if desired. The reaction may be carried out under atmospheric conditions, or under pressure in an autoclave; under the latter conditions, the reaction mass remains fluid. To the sodium titanate thus formed, water, which causes some hydrolysis of the titanate, and consequent formation of hydrated titanium dioxide and/or other titanate or titanates, is added. The solids are washed by decantation and then filtered and washed. The washed solids contain, by analysis after calcination, about 85% titanium dioxide and about 15% sodium oxide. No attempt is made herein to ascribe any definite composition to the original titanate formed nor to the solids remaining after treatment with water and washing.

If desired, the hydrated titanium dioxide pulp may be treated with a sufficient amount of an alkaline composition to react with the combined and/or adsorbed sulfuric acid and then diluted and washed to remove the sulfate prior to treatment with an alkaline alkali metal compound to form a titanate.

The washed solids are treated with hydrochloric acid in sufficient quantity to neutralize the sodium oxide and in sufficient excess for about 20% to about 50% of theory for the formation of titanium tetrachloride. About 25% of the theoretical quantity for titanium tetrachloride after neutralizing the sodium oxide is preferred. The hydrochloric acid slurry is diluted with water and boiled for about one hour. Nitric acid or other monobasic acids may be used in place of hydrochloric acid. The amount of acid used is ordinarily insufficient for complete solution of titanium, although peptization generally occurs. The titanium, however, during the boiling period, is transformed to a desirable rutile seed for use in converting anatase structure to rutile structure during calcination. Some such seeds prepared by us have shown by X-ray analysis substantially complete rutile structure.

If desired, the titanate may be treated directly with the monobasic acid thus omitting the water treatment. We prefer to use the water treatment, however, since it eliminates a large amount of the alkali metal and sulfate, and thereby reduces the amount of monobasic acid required. Furthermore, a more active seed is generally obtained if the alkali metal and sulfate are largely removed prior to the monobasic acid treatment.

The rutile seed thus formed may be used as such by mixing with an uncalcined hydrated titanium dioxide precipitate, obtained by hydrolytic precipitation from a titanium sulfate solution, at any stage in the process prior to the final washing before calcination, or it may be flocculated by adjusting the slurry to a pH of from about 4.5 to 7.5 by neutralizing with an alkaline reagent such as sodium carbonate, filtered, washed substantially free of chlorides and then mixed with an uncalcined hydrated titanium dioxide precipitate, obtained by hydrolytic precipitation from a titanium sulfate solution at any stage in the process prior to calcination.

Our special rutile seed is extremely finely divided, which probably accounts for its exceptional activity. By its use as a seed even in relatively small amounts, substantially complete conversion to rutile may be obtained under ordinary calcination conditions.

The amount of rutile seed used may vary within wide limits. While in general we prefer to use about 5% based upon the total weight of the titanium dioxide calcined, smaller and larger percentages may be used. Even as little as 1% or less is effective. Obviously there is no upper limit.

The actual amount of rutile seed used depends upon the amount of rutile conversion desired and also upon the desired other properties of the finished pigment, such as color and softness. The use of 5% or more seed induces conversion to rutile at a lower temperature or in a shorter time, or both, and thereby produces a pigment of rutile structure, which has a color higher in total brightness and which disperses more readily when ground in vehicles.

It is desired to place no limit upon the rutile conversion obtained. For certain purposes relatively small conversion may be desired and in other cases a substantially complete conversion may be desired. For example, it may be desirable to produce a pigment containing 15% rutile and 85% anatase or a pigment containing 90% rutile and 10% anatase. The hiding power and tinting strength of the pigment produced according to our process increases proportionately as the conversion to rutile increases.

A small amount of an iron salt, such as ferric ammonium sulfate, or a small amount of copper salt, such as copper sulfate, which salts decompose and form the oxides of the metals upon calcination, may be added at some stage prior to calcining to prevent bluing or graying of the color of the pigment during calcination. The preferred amount of iron is from about .01% to about .03%, calculated as $Fe_2O_3$, and based upon the weight of the titanium dioxide. If the uncalcined hydrated titanium dioxide already contains an appreciable amount of iron, the amount added is correspondingly less than the .01% to .03%, so that the calcined pigment will contain from .01% to .03% $Fe_2O_3$. The preferred amount of copper is from .0004% to .002%, calculated as CuO.

Detailed methods for the preparation of the rutile seed are given in Examples 2 and 3.

*Example 2*

The precipitate of Example 1 (containing 100 grams $TiO_2$) is diluted with water to about 30% calcined solids content. To this aqueous slurry is added 150 grams of flake sodium hydroxide while stirring continuously. The mixture is then heated for about two hours at a temperature of about 85° C. to 90° C., while continuously stirring and at a constant volume. The titanate thus formed is diluted to about 1.5 liters with water, washed twice by decantation, then filtered and washed substantially free of sulfates. The filter cake is slurried in 185 cc. of commercial 20° Bé. hydrochloric acid, diluted with one liter of water, and boiled at constant volume for about one hour. The seed slurry is cooled to 60° C., and adjusted to a pH of 6.0 by the addition of about 340 cc. of a 20% sodium carbonate solution. At this pH the seed is sufficiently flocculated to be filtered. It is filtered and washed substantially free of sodium and chloride ions.

*Example 3*

The precipitate of Example 1 (containing 100 grams of $TiO_2$) is diluted with water to about 30% calcined solids content. To this aqueous slurry is added 150 grams of flake sodium hydroxide while stirring continuously. The mixture is then heated for about two hours at a temperature of about 85° C. to 90° C., while stirring continuously and at a constant volume. The titanate thus formed is diluted to about 1½ liters with water, washed twice by decantation, then filtered and washed substantially free of sulfates. The filter cake is slurried in 95 cc. of commercial 42° Bé. nitric acid, diluted with one liter of water, and boiled at constant volume for about one hour.

Having described our invention and given examples illustrating methods for preparing the rutile seed, we now give examples illustrating the conversion of anatase structure to rutile structure.

*Example 4*

A thoroughly washed aqueous pulp of an hydrated titanium dioxide precipitate, obtained by hydrolytic precipitation from a titanium sulfate solution, and containing 200 grams of titanium dioxide, is mixed with a quantity of the neutralized and washed seed of Example 2 containing 6 grams of titanium dioxide, with 0.24 gram of ferric ammonium sulfate containing .04 gram of ferric oxide and with a concentrated aqueous solution containing 4.1 grams of potassium carbonate. The mixture is dried and roasted for one hour at a temperature of about 850° C. The roasted product is milled and slurried in sufficient water to give a pulp containing 15% solids. 5 cc. of commercial 20° Bé. hydrochloric acid are added, and the solids are filtered out and washed substantially free of sulfates. The washed filter cake is then dried, and calcined by slowly raising the temperature from about 300° C. to about 975° C. during about five hours, and then holding at a temperature of about 950° C. to about 1000° C. for about two hours.

The transformation to rutile, as determined by X-ray analysis, has been substantially complete. The tinting strength of the hydroclassified and dry milled pigment is 1720.

Tinting strength evaluations are based upon an arbitrary scale in which present commercial titanium dioxide of anatase crystal structure has a value of 1250.

*Example 5*

A thoroughly washed aqueous pulp of an hydrated titanium dioxide precipitate, obtained by hydrolytic precipitation from a titanium sulfate solution, and containing 200 grams of titanium dioxide, is mixed with a quantity of the neutralized, filtered and washed seed of Example 2, containing 10 grams of titanium dioxide, and with a concentrated aqueous solution containing 0.42 gram of potassium carbonate and calcined for about two hours at a temperature of about 975° C. to about 1000° C.

The calcined pigment contains by X-ray analysis about 90% rutile. The tinting strength of the hydroclassified and dry milled pigment is 1700. The color of the product is not quite as good as that of the product obtained in Example 4, due to the omission of the iron addition.

*Example 6*

A thoroughly washed aqueous pulp of an hydrated titanium dioxide precipitate, obtained by hydrolytic precipitation from a titanium sulfate solution and containing 200 grams of titanium dioxide, is diluted with water to a calcined solids content of 20% and mixed with 145 grams of the the nitric acid suspension of Example 3 containing 10 grams of titanium dioxide. The mixture is filtered and the filter cake is washed substantially free of nitrates. The filter cake is then mixed with 0.24 gram of ferric ammonium sulfate containing .04 gram of ferric oxide, and with a concentrated aqueous solution containing 0.42 gram of potassium carbonate, dried and calcined by slowly raising the temperature from about 300° C. to about 975° C. during about five hours, and then holding at a temperature of about 975° C. to about 1000° C. for about three hours.

The transformation to rutile, as determined by X-ray analysis, has been substantially complete. The tinting strength of the hydroclassified pigment is 1720.

While a rather definite calcination schedule is indicated in the examples, this schedule may be varied considerably. In actual commercial operation the calcination may be continuous through a rotating horizontal kiln which is heated at the discharge end and in which therefore there is a gradual temperature change from one end of the kiln to the other.

Our calcined pigment, obtained in accordance with any of the modifications of the invention, may be either simply dry milled or wet milled, hydroclassified, treated with the usual reagents, filtered, dried and disintegrated in accordance with the present known procedures for producing the commercial titanium dioxide pigments having the anatase crystal structure.

Our finished pigment has many desirable properties, such as good resistance to chalking, excellent resistance to discoloration in white baking enamels, etc., but is characterized in the main by its exceptional hiding power and tinting strength. The hiding power and tinting strength of the product in which the conversion to rutile has been substantially complete is in the neighborhood of 40% higher than that of present commercial titanium dioxide having the anatase crystal structure. When the conversion to rutile has been less the advantage in hiding power and tinting strength is correspondingly less.

We claim:

1. In the preparation of a rutile seeding agent for the conversion of a hydrated titanium dioxide obtained by the hydrolysis of a titanium sulfate solution to rutile, the steps which comprise precipitation of hydrated titanium dioxide from a sulfate solution by admixture and heating with sufficient hot aqueous alkaline solution to produce a factor of acidity of 40%, whereby precipitation is completed in a few minutes, converting the hydrated oxide to an alkali metal titanate, treating the titanate with an aqueous monobasic acid in sufficient amount to completely convert the alkali metal content to the salt of the monobasic acid and to theoretically convert 20–50% of the titanium content to the salt of the monobasic acid, and boiling the resultant mixture for about 1 hour whereby the titanium content is substantially converted to a rutile conversion seed capable of converting to rutile a hydrated titanium dioxide obtained by the hydrolysis of a titanium sulfate solution upon admixture therewith in amounts of about 1–5% by weight and calcination at temperatures of about 900° C. to about 1000° C.

2. In the preparation of a rutile seeding agent for the conversion of a hydrated titanium dioxide obtained by the hydrolysis of a titanium sulfate solution to rutile, the steps which comprise precipitation of hydrated titanium dioxide from a sulfate solution by admixture and heating with sufficient hot aqueous alkaline solution to produce a factor of acidity of 40%, whereby precipitation is completed in a few minutes, converting the hydrated oxide to a sodium titanate, treating the titanate with hydrochloric acid in sufficient amount to completely convert the alkali metal content to the salt of the monobasic acid and to theoretically convert 20–50% of the titanium content to the chloride, and boiling the resultant suspension for about 1 hour whereby the titanium content is substantially converted to a rutile conversion seed capable of converting to rutile a hydrated titanium dioxide obtained by the hydrolysis of a titanium sulfate solution upon admixture therewith in amounts of about 1–5% by weight and calcination at temperatures of about 900° C. to about 1000° C.

3. A method of preparing a rutile seeding agent having rutile crystal structure which comprises the precipitation of hydrated titanium dioxide from a titanium sulfate solution by admixture and heating with sufficient hot aqueous alkaline solution to produce a factor of acidity of 40%, whereby precipitation is completed in a few minutes, converting the hydrated oxide to an alkali metal titanate, water-washing the titanate, treating the washed titanate with an aqueous monobasic acid in sufficient amount to completely convert the alkali metal content to the salt of the monobasic acid and to theoretically convert 20–50% of the titanium content to the salt of the monobasic acid, and heating the resultant suspension and thereby obtaining a rutile seeding agent having rutile structure capable of converting to rutile a hydrated titanium dioxide obtained by the hydrolysis of a titanium sulfate solution upon admixture therewith in amounts of about 1–5% by weight and calcination at temperatures of about 900° C. to about 1000° C.

WINFRED J. CAUWENBERG.
LEIF AAGAARD.

REFERENCES CITED

The following references are of record in the file of this patent:

UNITED STATES PATENTS

| Number | Name | Date |
|---|---|---|
| 1,288,863 | Fladmark | Dec. 24, 1918 |
| 1,922,328 | Rhodes | Aug. 15, 1933 |
| 2,303,306 | Tillmann | Nov. 24, 1942 |
| 2,290,113 | Bousquet | July 14, 1942 |
| 2,029,881 | Little | Feb. 4, 1936 |
| 2,182,420 | Allan et al. | Dec. 5, 1939 |
| 2,292,507 | Brooks | Aug. 11, 1942 |
| 2,301,412 | Keats et al. | Nov. 10, 1942 |
| 1,697,929 | Ryan | Jan. 8, 1929 |

FOREIGN PATENTS

| Number | Country | Date |
|---|---|---|
| 533,227 | Great Britain | Feb. 10, 1941 |
| 149,316 | Great Britain | June 16, 1921 |
| 463,996 | Great Britain | Apr. 8, 1937 |
| 405,669 | Great Britain | Feb. 12, 1934 |
| 309,051 | Great Britain | Apr. 2, 1929 |

OTHER REFERENCES

Mellor, "Comprehensive Treatise on Inorganic and Theoretical Chemistry," vol. VII, page 39.